(12) United States Patent
Bak et al.

(10) Patent No.: US 9,984,345 B2
(45) Date of Patent: May 29, 2018

(54) RULE ADJUSTMENT BY VISUALIZATION OF PHYSICAL LOCATION DATA

(71) Applicant: International Business Machines Corporation, Armonk, NY (US)

(72) Inventors: Peter Bak, Haifa (IL); Dolev Dotan, Bustan HaGlil (IL); Tali Yatzkar-Haham, Moshav Yaad (IL)

(73) Assignee: International Business Machine Corporation, Armonk, NY (US)

( * ) Notice: Subject to any disclaimer, the term of this patent is extended or adjusted under 35 U.S.C. 154(b) by 682 days.

(21) Appl. No.: 14/483,158

(22) Filed: Sep. 11, 2014

(65) Prior Publication Data

US 2016/0078387 A1    Mar. 17, 2016

(51) Int. Cl.
  *G06Q 10/06*    (2012.01)
  *G06F 3/0484*   (2013.01)

(52) U.S. Cl.
  CPC ... *G06Q 10/06375* (2013.01); *G06F 3/04842* (2013.01); *G06F 3/04847* (2013.01); *G06Q 10/067* (2013.01)

(58) Field of Classification Search
  CPC .. G06Q 10/06375; G06Q 10/00; G06Q 40/06; G06Q 17/60
  USPC .............................................. 705/7.37, 7.11
  See application file for complete search history.

(56) References Cited

U.S. PATENT DOCUMENTS

| | | | |
|---|---|---|---|
| 6,651,049 B1 | 11/2003 | Agrawal et al. | |
| 7,069,234 B1* | 6/2006 | Cornelius | G06Q 20/10 705/26.35 |
| 7,451,148 B2* | 11/2008 | Childress | G06Q 40/02 |
| 7,640,213 B2* | 12/2009 | Reunert | G06Q 20/10 705/39 |
| 7,667,596 B2* | 2/2010 | Ozdemir | G08B 13/196 340/539.22 |
| 7,979,362 B2 | 7/2011 | Zhao et al. | |
| 8,533,175 B2* | 9/2013 | Roswell | G06F 17/3089 705/27.1 |

(Continued)

FOREIGN PATENT DOCUMENTS

GB    2451240    1/2009

OTHER PUBLICATIONS

White Paper "Decision Services: The Next SOA Challenge", Dec. 2006, ILOG Inc., pp. 1-8.*

(Continued)

*Primary Examiner* — Romain Jeanty

(57) ABSTRACT

According to some embodiments of the present invention there is provided a computerized method for visually modifying a rule. The method may comprise receiving a rule and two or more data records, the rule comprising two or more computation instructions and each one of the data records comprising one or more physical location value. The method may comprise displaying a simulation comprising visual objects, each of the visual objects showing a result of applying the rule to one of the data records, and displayed on a computerized display at a position corresponding to the physical location value of the data records. The method may comprise receiving a marking from a user of one or more of the visual objects on the computerized display. The method may comprise modifying the computation instructions to produce a modified rule, based on the markings, and sending the modified rule.

20 Claims, 7 Drawing Sheets

(56) References Cited

U.S. PATENT DOCUMENTS

| | | | |
|---|---|---|---|
| 2009/0179998 A1* | 7/2009 | Steinberg | G06T 7/0042 348/222.1 |
| 2010/0057597 A1* | 3/2010 | Vilrokx | G06Q 10/06 705/32 |
| 2010/0098342 A1* | 4/2010 | Davis | G06K 9/0063 382/220 |
| 2013/0103636 A1 | 4/2013 | Baudel et al. | |

OTHER PUBLICATIONS

Papadias et al., "Approximate Spatio-Temporal Retrieval", ACM Transactions on Information Systems (TOIS) TOIS Homepage archive, vol. 19 Issue 1, Jan. 2001 , pp. 53-96.

Kiran Kumar Indukuri, "Fusion: A Visualization Framework for Interactive ILP Rule Mining With Applications to Bioinformatics", Thesis submitted to the faculty of the Virginia Polytechnic Institute and State University in partial fulfillment of the requirements for the degree of master of science, Dec. 2004, USA.

Turchin et al.,"Tuning Complex Event Processing Rules Using the Prediction Correction Paradigm", DEBS '09 Proceedings of the Third ACM International Conference on Distributed Event-Based Systems, Article No. 10, 2009.

Bosch, "Business Rules Management With Visual Rules: Intelligent Software for Intelligent Decisions", Sep. 2013. Can be found at: http://www.bosch-si.com/media/es/documents_3/visual_rules_suite.pdf.

Kulakowski et al., "Using UML State Diagrams for Visual Modeling of Business Rules", Proceedings of the International Multiconference on Computer Science and Information Technology, vol. 3, pp. 189-194, 2008.

\* cited by examiner

RULE ADJUSTMENT BY VISUALIZATION OF PHYSICAL LOCATION DATA

BACKGROUND

The present invention, in some embodiments thereof, relates to operational decision management and, more specifically, but not exclusively, to visual display of data, visual display of rule results, and modification of results for rule adjustment.

Operational Decision Management is a growing discipline of importance for organizations who seek to improve and automate information-based decisions. Technologies such as Business Rule Management System and Event Processing Systems enable organization to design, manage and execute business logic rules and policies in operational systems. Such tools also provide an interface for the business users to be able to customize the rules and be as self-sufficient as possible in order to respond to changing business needs. The goal is to minimize dependencies on technical support personnel to accomplish these tasks.

For example, the rule that needs to be configured is a series of steps, each step may be an expression such as "If [[attribute_A=X] and [attribute_B>Y]] Then [action]" and the business user selects the attributes and values to form such an expression. In this example, attribute_A and attribute_B may denote attributes of a data element, and the like, such as an incoming event data element. For example, the event may be saved as a record of a database where attribute_A and attribute_B may denote field variables of the data record in the a database, In this example, X and Y denote threshold values to compare to the respective values of field variables of a data record of a database. In this example, action denotes a possible result value assignment, an internal variable assignment, an expression, or another rule step. The steps of a rule may be implemented as computing instructions to be performed on the data, and completion of the processing steps determines the rule result.

The rule based classification determines when a specific data record belongs to a class of records or not, also referred to by the term binary classification. The classification rule is a set of computations performed on values of a data record, such as a record of a database, which determines when the predicted classification of the data records is exhibits the rule or not. The rule result determination is the predicted result of applying the rule to the data record and in binary classification is a true or false predicted result value. The predicted result is compared to known true outcomes from test cases to measure the performance of the rule. For example, data records the rule predicted as true and are actually true are called true positives. For example, data records the rule predicted as false and are actually false are called true negatives. False positives, or type I errors, are data records with true rule predictions but actual false outcomes. False negatives, or type II errors, are data records with false rule predictions but actual true outcomes. Sensitivity is the sum of true positives divided by the total actual positives (sum of true positives and false negatives). Specificity is the sum of true negatives divided by the total actual negatives (sum of true negatives and false positives). Precision is the sum of true positives divided by the total predicted positives (sum of true positives and false positives). Accuracy is the sum of true positives and true negatives divided by the total number of data records. The terms classification rule measures described herein may be described in a contingency table.

Existing methods allow using clustering algorithm results for visualization. However the user needs to change the clustering algorithm parameters manually by manually adjusting each individual parameter value separately.

In U.S. provisional patent application Ser. No. 13/955,005, incorporated herein in its entirety by reference, it has been described how a rule is defined from visual selection.

SUMMARY

According to some embodiments of the present invention there is provided a computerized method for visually modifying a rule. The method may comprise receiving a rule and two or more data records, the rule comprising two or more computation instructions for each of the data records and each one of the data records comprising one or more physical location value. The method may comprise displaying a simulation comprising two or more visual objects, each of the visual objects showing a result of applying the rule to one of the data records, and displayed on a computerized display at a position representing a physical location value corresponding to the one of the data records. The method may comprise receiving one or more marking from a user of one or more of the visual object on the computerized display to indicate a user desired adjustment in the results of applying the rule. The method may comprise modifying the computation instructions to produce a modified rule, based on a marking. The method may comprise sending the modified rule.

Optionally, the method further comprises modifying one or more of the visual objects on the computerized display to show a marking received from the user.

Optionally, the method further comprises modifying one or more of the visual objects on the computerized display to show a modified result of applying the modified rule to one or more of the data records.

Optionally, the method further comprises modifying one or more of the visual objects on the computerized display to show an indication of the rule modification.

Optionally, the modifying comprises changing automatically one or more threshold value of one or more of the computation instructions.

Optionally, the modifying comprises changing one or more threshold value of one or more of the computation instructions by receiving a user instruction.

Optionally, the modifying comprises changing automatically one or more threshold value of one or more of the computation instructions according to a data mining algorithm, a machine learning algorithm, a clustering algorithm, and a supervised learning algorithm.

Optionally, one or more of the computation instructions further comprises one or more variable associated with a field of the data records and the modifying comprises replacing a variable with one or more second variable associated with a second field of the data records.

Optionally, the modifying comprises any from a list of replacing one or more of the computation instructions, adding one or more new computation instruction, and removing one or more of the computation instructions.

Optionally, the rule is any from a list of a time dependent rule and a rule of two or more events.

Optionally, one or more of the visual objects represent a corresponding one or more temporal data value.

Optionally, the data records further comprise temporal data.

Optionally, the displaying further indicates one or more relationship between the data records.

Optionally, one or more of the computation instructions is modified by changing one or more physical location area for application of a of the computation instructions.

Optionally, one or more marking to one or more of the visual object is marking of a false result.

Optionally, the visual objects are displayed with one or more graphical attribute displayed according to a field value of corresponding one of the data records any from a list of a visual object size, a visual object shape, a visual object texture, a visual object color, a visual object hue, a visual object transparency, a visual object brightness, a visual object saturation, a visual object size, an overlaid one or more character, and an overlaid one or more second visual object.

Optionally, a graphical attribute is displayed using additional blinking patterns.

Optionally, a computer readable medium comprises computer executable instructions adapted to perform the method.

According to some embodiments of the present invention there is provided a computer program product for visually modifying a rule. The computer program product may comprise a computer readable storage medium having stored thereon first program instructions executable by a processor to cause a device to receive a rule and two or more data records, the rule comprises two or more computation instructions for each of the data records and each one of the data records comprising one or more physical location value. The computer program product may comprise a computer readable storage medium having stored thereon second program instructions executable by a processor to cause a device to display a simulation comprising two or more visual objects, each of the visual objects showing a result of applying the rule to one of the data records, and displayed on a computerized display at a position representing a physical location value corresponding to the one of the data records. The computer program product may comprise a computer readable storage medium having stored thereon third program instructions executable by a processor to cause a device to receive one or more marking from a user of one or more of the visual object on the computerized display to indicate a user desired adjustment in the results of applying the rule. The computer program product may comprise a computer readable storage medium having stored thereon fourth program instructions executable by a processor to cause a device to modify the computation instructions to produce a modified rule, based on a marking. The computer program product may comprise a computer readable storage medium having stored thereon fifth program instructions executable by the processor to cause the device to send the modified rule.

According to some embodiments of the present invention there is provided a computerized device for visually modifying a rule. The computerized device may comprise a user interface. The computerized device may comprise one or more processing unit, comprising modules of processor instructions. The processor instructions modules may be configured to receive a rule and two or more data records, the rule comprises two or more computation instructions for each of the data records and each one of the data records comprising one or more physical location value. The processor instructions modules may be configured to display using the user interface a simulation comprising two or more visual objects, each of the visual objects showing a result of applying the rule to one of the data records, and displayed on a computerized display at a position representing a physical location value corresponding to the one of the data records. The processor instructions modules may be configured to receive using the user interface one or more marking from a user of one or more of the visual object on the computerized display to indicate a user desired adjustment in the results of applying the rule. The processor instructions modules may be configured to modify the computation instructions to produce a modified rule, based on a marking. The processor instructions modules may be configured to send the modified rule.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
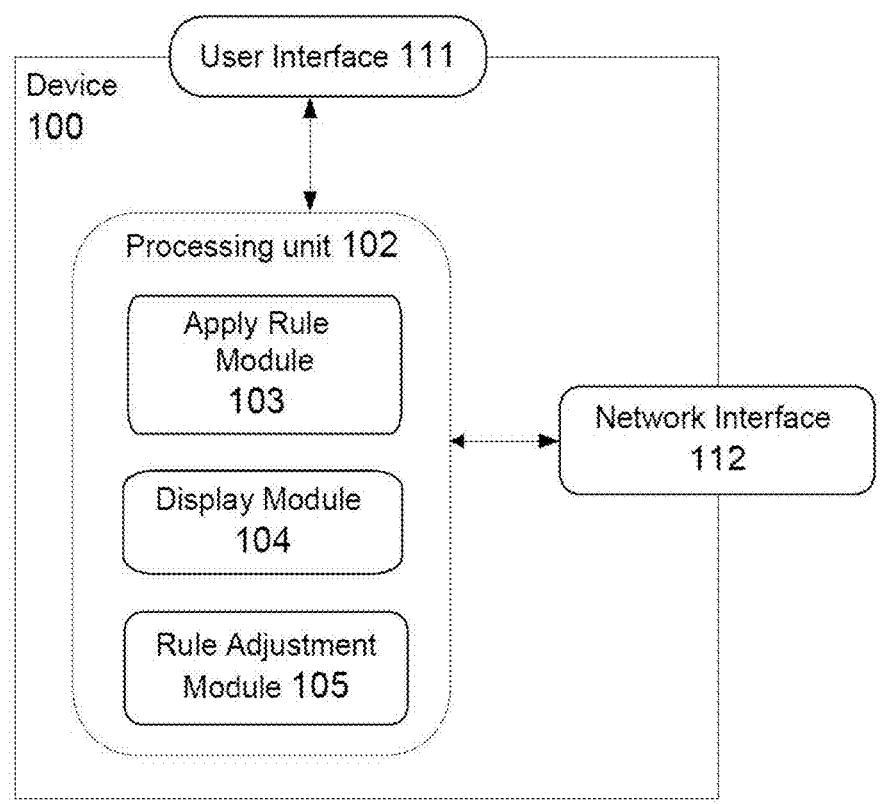
FIG. 1 is a schematic illustration of a device for visually modifying a rule showing device components, according to some embodiments of the invention.

The present invention, in some embodiments thereof, relates to operational decision management and, more specifically, but not exclusively, to visual display of data, visual display of rule results, and modification of results for rule adjustment.

Customization of business logic rules for geographical data or moving objects requires more sophisticated tools than those used for general purpose operational decision management. For example, a business user needs to define rules that relate to safety monitoring of light vehicles and heavy trucks in a mine. In this example, some aspects of the rule involve setting speed limits in a given area or along a given path, or restricted access to an area boundary. Such information is difficult to express numerically in an expression builder. In many cases a business user, may not be able to determine the specific parameters and the geographical conditions before visualizing the data itself. For example, after viewing historical data of accidents or near-accidents within a region, the user determines proper speed and location based on the historical data.

Existing methods have described how a rule is defined from visual selection, and extracted from filters defined by the user. Yet even after a rule is defined, there is a need to monitor the rule results and verify the accuracy of the rule predictions such that it correctly detects all the true cases and that it doesn't miss detections. There is also a need to verify that there are no false alarms, and that the rule didn't detect cases that shouldn't be detected. These happens either because not all the aspects of the data were taken into account in the rule definition, the rule needs some adjustments or new steps need to be added to the rule. Therefore, there is a need to adjust the rule taking into account the rule's misses and false alarms.

According to some embodiments of the present invention there are provided methods and devices, for rule adjustment by allowing the user to visually examine the data and rule results, correct the rule results, for example by marking misses and false alarms, and interactively adjust the formal definition of the rule using adjustment algorithms. The benefits to the user include easy and transparent modification of rules based on simple marking of erroneous results of visual objects, without need for understanding the logic and expression syntax of the underlying rules. Other benefits include visual verification of rule modifications to easily reach an optimal rule modification to best suit a desired result.

Existing solutions for rule refinement, some with user interactions, use methods for comparing between rule results, such as champion challenger, supervised learning, vector machines, clustering, and/or the like. However, the events are not placed on a computerized display according to their location on a map, provide graphical representation of the various events according to their attributes, provide visualization of rule results, and provide visualization result corrections together with iterative rule adjustment algorithms. The methods described herein according to some embodiments of the invention visually presented to the user the data records and rule as visual objects that allow the user to examine rule results, provide feedback, and activate an adjustment algorithm done in an iterative manner.

According to some embodiments of the present invention there is provided a method and a device, to iteratively refine a rule, based on a user-guided adjustment of rule parameters and conditions using visualization. The process allows visual presentation of physical location data and rule results. Incorrect results are received, such as missed or falsely detected items. These incorrect results may be used to automatically adjust the formal definition of the rule by modification of the parameters, the attributes that are compared to these parameters, and/or the steps of the rule. These new adjustments are applied to the data and visually represented to the user for comparison to the unmodified rule as a feedback loop of the rule adjustment. These steps are repeated until the rule results are satisfactory, and the rule is correctly adjusted. The incorrect results are marked as false alarms and misses, allowing the method to suggest a rule refinement and mark the new results based on the display. Using some aspects of some embodiments of the invention, it is much easier for a user to modify the rule using the methods and devices described herein since the user is familiar with the problem domain and/or the data records and rule outcome are represented graphically. Without such methods, decision management products have difficulty in configuring and fine-tuning rules to solution areas that involve spatial and/or temporal properties, such as physical location and/or movement.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of a device for visually modifying a rule showing device components, according to some embodiments of the invention. The device 100 comprises one or more processing units 102, a user interface 111, and a network interface 112. The one or more processing unit 102 comprises an Apply Rule module 103 for receiving data records and a rule and computing a result for each data record. The one or more processing unit 102 comprises a Display module 104 for receiving the data records and result values, and displaying them through a user interface 111 on a computerized display. The one or more processing unit 102 comprises a Rule Adjustment module 105 for modifying the rule, computing modified results, and displaying the modified results on the computerized display.

The Apply Rule module 103 receives two or more data records from a database using the network interface 112. The data record may represent a data element, an event or a composite event that was generated based on other events. Each data record comprises spatial data, such as physical location data, and/or temporal data, such as velocity, time of day, and/or acceleration data. The Apply Rule module 103 also receives a rule from a database using the network interface 112. The rule comprises computing steps to convert each of the data records to a predicted result value, such as a rule result. The data records may be received from a network attached storage database and/or database server attached to the network. The rule may be received from a network attached storage database and/or database server attached to the network. The Apply Rule module 103 uses the received data records and rule to compute a result value to predict the result from the data record values. By applying the rule to each of the data records a predicted result value is generated for each data record, which can be compared with measured outcome values.

The Display module 104 receives predicted result values and data records. The Display module 104 instructs a computerized display to show visual objects on the display, one for each data record and predicted result value. The attributes of each visual object, such as shape, size, color and the like, correspond to the respective data record values and predicted result value, and is displayed at a location on the computerized display corresponding to the physical location data of that data record, such as showing an icon of a boat on a nautical map, or showing an icon of a train in a schematic illustration of mine tracks.

The Rule Adjustment module 105 receives at least one correction to the predicted result values based on true outcome values user knowledge, and/or user observation according to the data presented on the map, forming a group of erroneous result values. Optionally, the Rule Adjustment module 105 receives the corrections from the device user through the user interface 111. Optionally, the Rule Adjustment module 105 receives the corrections from a database of result values associated with the data records through the network interface 112. The Rule Adjustment module 105 adjusts the rule using a user adjustment received through the user interface 111 and/or using algorithms for rule adjustment defined in the Rule Adjustment module 105, producing a modified rule. The Rule Adjustment module 105 computes modified result values by applying the modified rule to the data records. The Display module 104 receives the modified result values, and adjusts the visual objects displayed to the user. The visual objects are adjusted so that the changes between the previously displayed predicted result values and the new modified result values are distinguished. This visual object display adjustment allows the user to determine when the modified rule has reduced the number corrections and/or erroneous result values. The modified rule may introduce new erroneous results, and to be presented to the user in a visual way on the user interface.

Optionally, visual object adjustment shows the user an importance measure of the erroneous result values, such as the minimum distance reached between two ships that almost collided. The rule modification process is repeated, as in iterations, until the user determines that the modified rule is suitably modified and the modified rule is sent for operational implementation using the network interface 112. The user may determine that the rule is suitably modified based on the sensitivity, specificity, precision, accuracy, and/or the like of the rule results, collectively referred to herein as the rule measures. Optionally, the user may determine that the rule is suitably modified based weighted rule measures, such as the relative cost of a type I or type II error.

Figure 2:
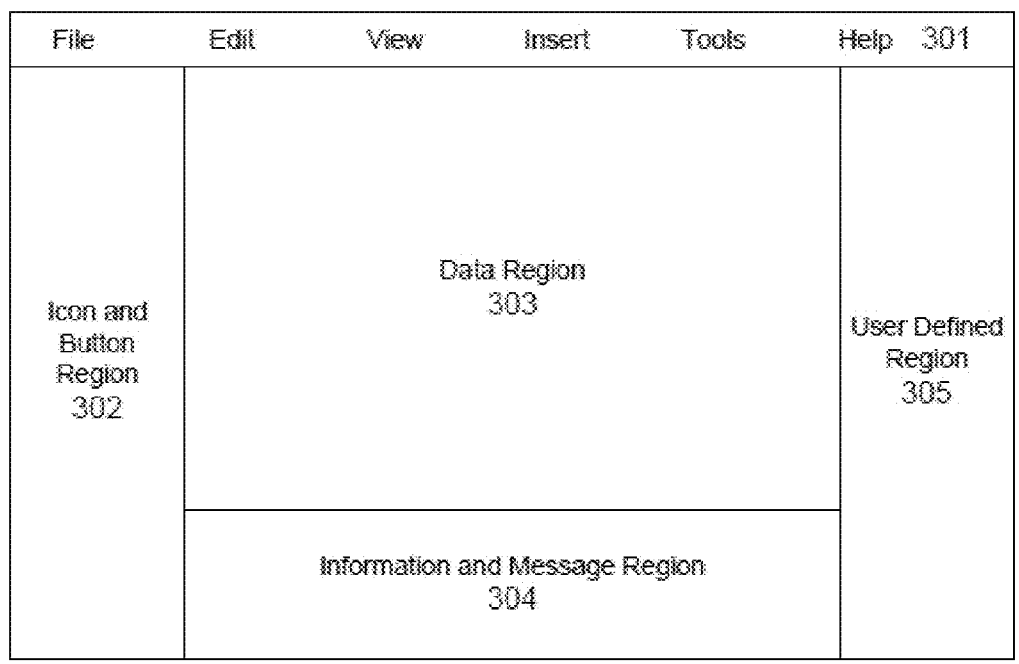
FIG. 2 is a schematic illustration of a user interface for visually modifying a rule showing display regions, according to some embodiments of the invention.

Reference is now made to FIG. 2, which is a schematic illustration of a user interface for visually modifying a rule showing display regions, according to some embodiments of the invention. The example user interface 111 display may comprise a menu region as at 301. The example user interface 111 display may comprise an icon and button region 302. The example user interface 111 display may comprise a data region 303. The example user interface 111 display may comprise an information and message region 304. The example user interface 111 display may comprise a user defined region 305.

Figure 3:
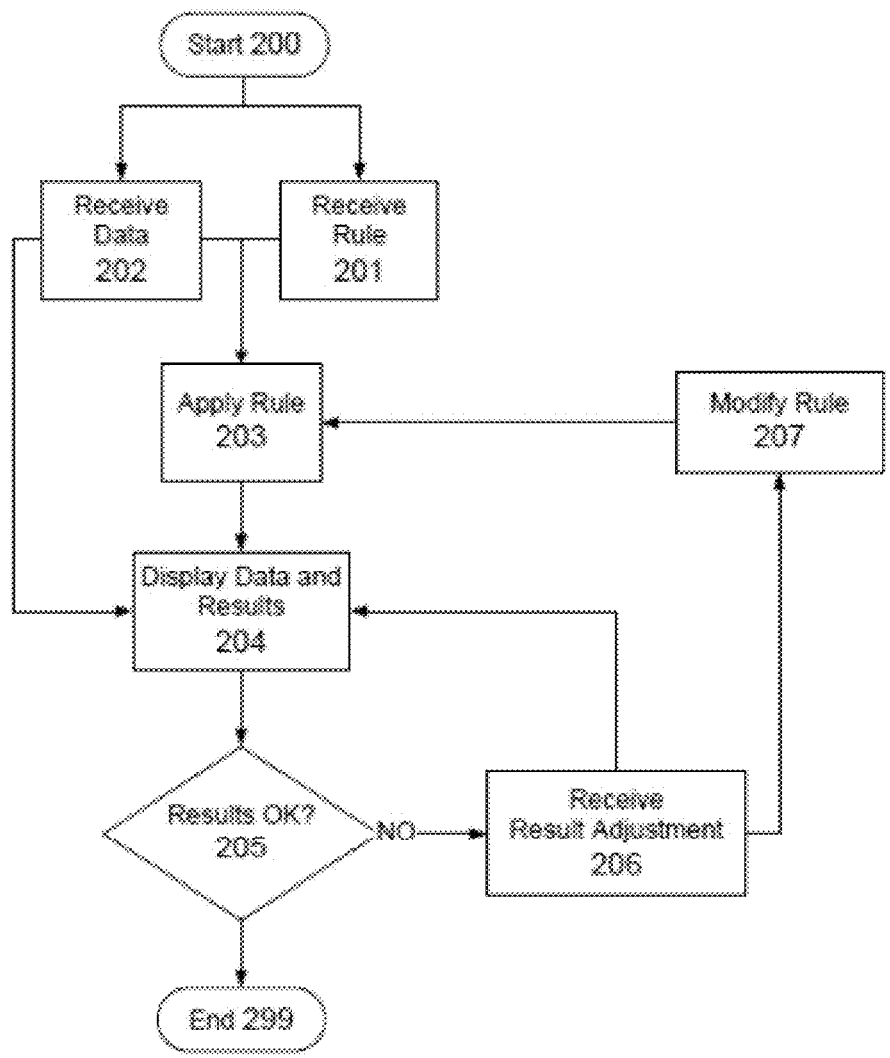
FIG. 3 is a flowchart for visually modifying a rule showing actions, according to some embodiments of the invention.

Reference is now made to FIG. 3, which is a flowchart for visually modifying a rule showing actions, according to some embodiments of the invention. At the start 200 of the method, two or more data records 202 and a rule 201 are received by the Apply Rule module 103 located at a processing unit 102 of the device 100. The results of applying the rule to the data records are computed 203, referred to herein as the predicted result values, by the Apply Rule module 103. The data and rule results are displayed 204 by the Display module 104 to the user using a user interface 111. As shown at 205, when the predicted result values determined by the rule do not sufficiently determine the true measured outcomes, as shown in 206 the method receives results corrections using the Display module 104 and the corrections are added to the visual objects of the computerized display. The corrections are received from the user through the user interface 111, or from a storage and/or database server through the network interface 112. Based on the result corrections received at 206, the rule is modified 207, modified result values are computed 203, and the user interface 111 display is updated to display 204 visual objects at each data record location that show the changes to the results. The step of rule modification as at 206 is repeated, as in iterations, until the rule definition is satisfactorily modified and the modified results are sufficiently accurate 205, and the method ends 299. After every rule adjustment, the updated results are visually presented to the user allowing the user to iterate again when needed.

Now is disclosed a detailed example of the method according to some embodiments of the invention. In this example, the rule and data are visual represented to the user, allowing the user to mark wrong or missed result detections, and which serves as input for rule a rule fine-tuning. According to this example, the user is allowed to adjust rule definition using the following steps.

Optionally, when the user marks a result as being false, a change is made to the visual object of that result. For example, the marked result is displayed as blinking. For example, the marked result is displayed with an overlaid 'x". For example, the marked result is displayed with a larger size.

Optionally, when a modified result is computed from a modified rule for a data record, a change is made to the corresponding visual object. For example, the compliance with the rule is indicated as an attribute of the visual object. For example, the visual object is displayed in a blinking pattern. For example, the visual object is overlaid with a 'v' character or graphical mark.

Optionally, a rule is modified using a data mining algorithm. For example, a machine learning algorithm, a clustering algorithm, a supervised learning algorithm and/or the like are used to modify the rule.

Optionally, a rule is modified by changing a threshold of one of the rule steps. For example, a threshold in one of the rule steps is changed automatically by the computer to best make corrections to the rule to comply with the marked false results. For example, a threshold in one of the rule steps is changed by the user selecting a new threshold. For example, a threshold in one of the rule steps is changed by the user selecting moving a sliding bar and viewing the modified rule results dynamically.

Optionally, a rule is modified by changing a variable of one or more steps in the rule. For example, a rule step specifying that speed of a boat be less than 30 nautical knots is changed to distance between boats be less than 100 meters.

Optionally, a rule is modified by changing, removing and/or adding one or more steps to the rule. For example, an overly limiting step is removed. For example, a rule is refined by adding a step.

Optionally, a rule is modified by changing a physical location defined region and/or area of one or more steps of the rule. For example, a map is marked with a demilitarized zone (DMZ) and a rule step to limit vehicle speeds in the DMZ, but after checking the history of this rule it is determined that the speed limited area needs to be extended 20 meters around the DMZ by a dilation operation of the DMZ area.

Figure 4:
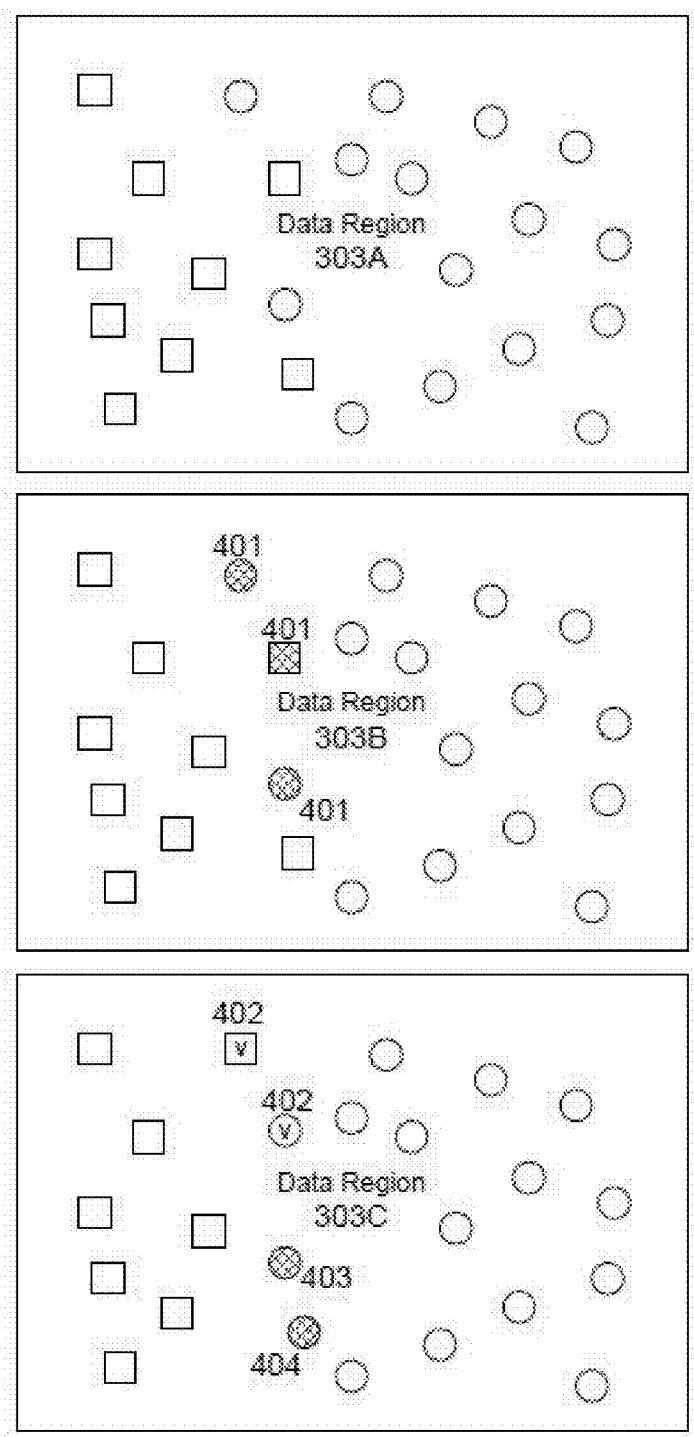
FIG. 4 is a schematic illustration of an example of visually modifying a rule showing a data region of a user interface display, according to some embodiments of the invention.

Reference is now made to FIG. 4, which is a schematic illustration of an example of visually modifying a rule showing a data region of a user interface display, according to some embodiments of the invention. The rule results of data records are visually presented to the user by indicating on the computerized display 303A of the user interface 111 the data records that satisfied the rule (hit) as squares and data records that didn't satisfy the rule as circles. The data is represented graphically according to its attributes, according to physical location attributes of the data record on a map or schematic illustration of physical locations. Optionally, the data has additional visual indications such size, shape, color, texture, color brightness and/or the like according to various field values of the data record, such as speed acceleration, weight, and the like. For example, the location on of the visual object on the display corresponds to the physical location on the map. Optionally, when previous visualization decisions have been made by the user they are used to display the visual object, such as a user decision that a result is erroneous and the visual object corresponding to that result will have an "X" overlaid on the graphical element. Optionally, the rule results in the original rule version are displayed. Optionally, the user decides on additional visualization and/or visualization changes according to field values of the data record. For example, the size of the visual object corresponds to the weight of the vehicle from the data record corresponding to that visual object. The visualization allows the user to examine the rule results, determine which predicted result values are valid, which values are false alarms, and which events the rule missed.

In this example, the user then marks wrong detection and missing detections using the user interface 111 as at 303B. Whenever the user marks a result as wrong, a visual indication, such as the crosshatch texture of the visual object in this example as at 401, is added to the data display.

This example allows adjustment of rule automatically by the Rule Adjustment module 105 and/or using user input from the user interface. Having the data and rule results presented visually to the user, the user may understand what rule parameters should be changed. For example, according to the location of the wrong/missing detection on a map of physical locations. For example, according to some other attribute's value of the data that is visualized by the visual object size. The user may change, remove, and/or add the related attribute to the rule step, allowing the user perform analysis on this attribute. The user may find the rule step expression that correctly predicts the rule results that correspond to the actual results. The user may activate an adjustment algorithm that automatically adjusts the rule according to the erroneous predicted results.

In this example, the method next displays the adjusted rule result combined with the previous results by showing changes and new potentially wrong results. Previous false alarms and/or misses that were fixed by the adjusted rule have visual indication, such as a "V" sign as at 402. New false alarms or misses have another visual indication, such as the crosshatch texture of the visual object as at 403 and 404. The user iteratively repeats the rule adjustments in the steps of this example until the rule is sufficiently adjusted so that the amount of erroneous predicted result values is reduced, and/or no further modifications to the rule reduces the number of erroneous result values and/or their importance.

As an example of application instance, a harbor traffic operator needs to be alerted when two ships are closer together than a distance prescribed by law, which is 240 meters at open sea under good weather conditions. However, the actual distance threshold needs refinement due to changes in weather and/or visibility conditions, the number of ships in different areas, and/or the like. In this example, using the methods according to some embodiment of the invention, the harbor traffic operator is able to visually inspect the harbor map on a computerized display and see the ships as visual objects on the display. The rule results for each ship are computed and displayed as part of the visual object, such as red for ships that triggered an alarm and green for ships that did not. The user may select areas of interest, and mark those alarms that are false-alarms in the selected area, and the rule is adjusted to a new threshold, such as from 240 meters to 215 meters, for alerting the harbor traffic operator that the ships are too close. The new threshold rule is computed and drawn on the computerized display, and compared to the expected results. False alarms, correct rejections, hits and misses are displayed to the display allowing the operator to interact with the rule in a domain specific language and not needing to learn complex event processing terminology.

Figure 5A:
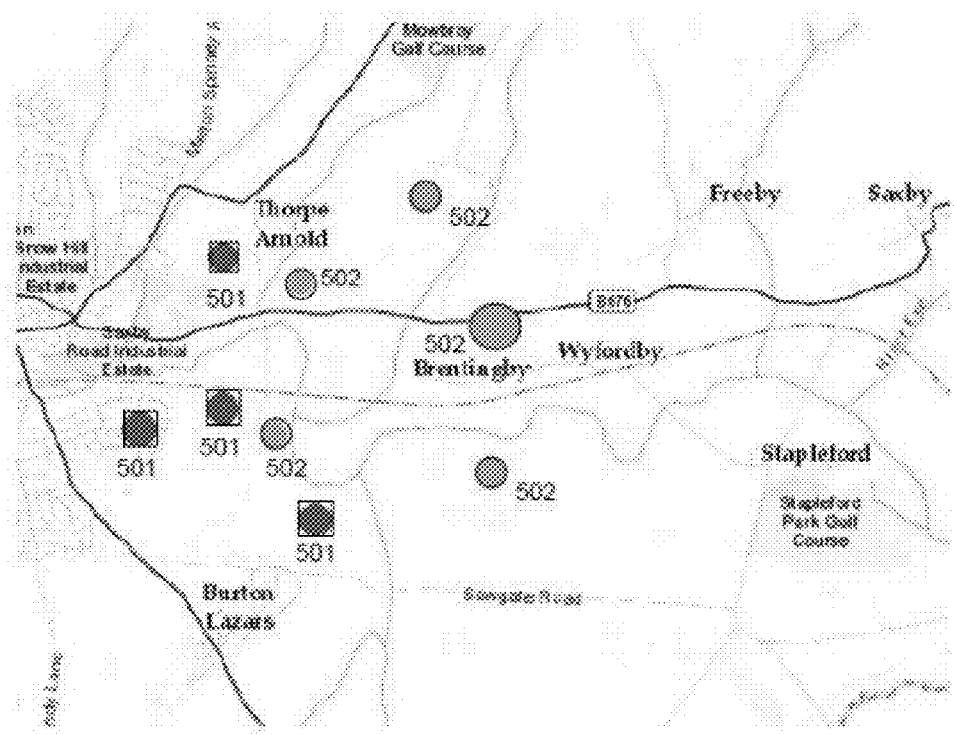
FIG. 5A is a schematic illustration of an example of a data region of a user interface display showing a geographical map with visual objects, according to some embodiments of the invention.

Another example is shown in the following drawings. Reference is now made to FIG. 5A, which is a schematic illustration of an example of a data region of a user interface display showing a geographical map with visual objects, according to some embodiments of the invention. The example shows a geographical map of a region, with data records for specific physical locations on the map and associated rule results marked as visual objects. The data records that comply with the rule are marked as squares as at 501 and the data records that do not comply with the rule are marked with circles as at 502.

Figure 5B:
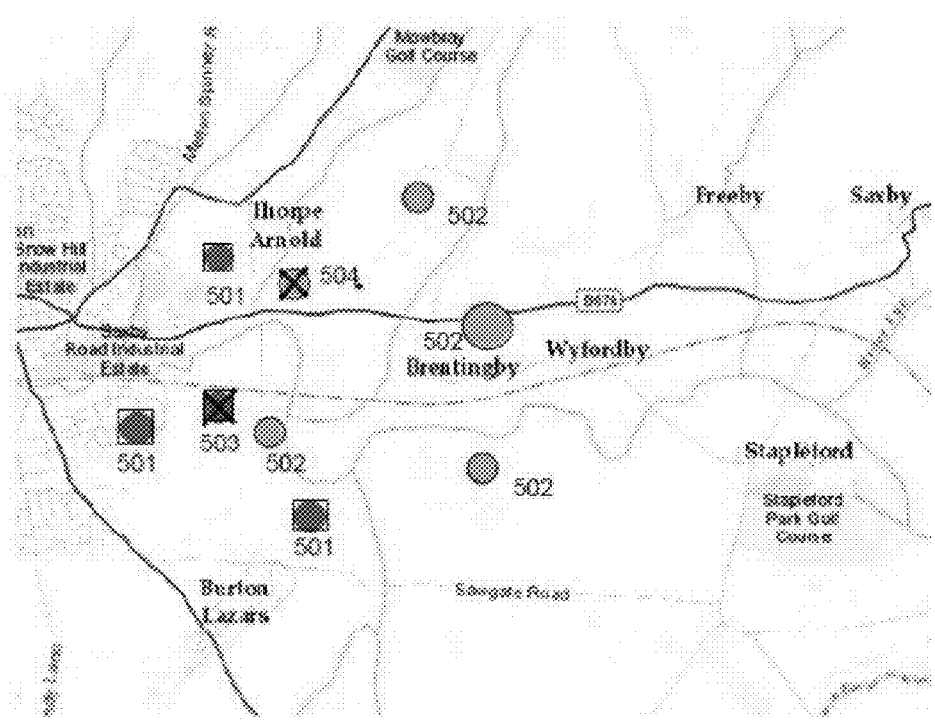
FIG. 5B is a schematic illustration of an example of a data region of a user interface display showing a geographical map with visual objects after receiving a marking by a user, according to some embodiments of the invention.

Reference is now made to FIG. 5B, which is a schematic illustration of an example of a data region of a user interface display showing a geographical map with visual objects after receiving a marking by a user, according to some embodiments of the invention. This figure is a continuation of the example in FIG. 5A. The user marks visual objects that are not correctly determined by the rule, such as a false comply result as at 503 and a false not-comply result as at 504. The visual objects marked are overlaid in this example with an "X" graphical element.

Figure 5C:
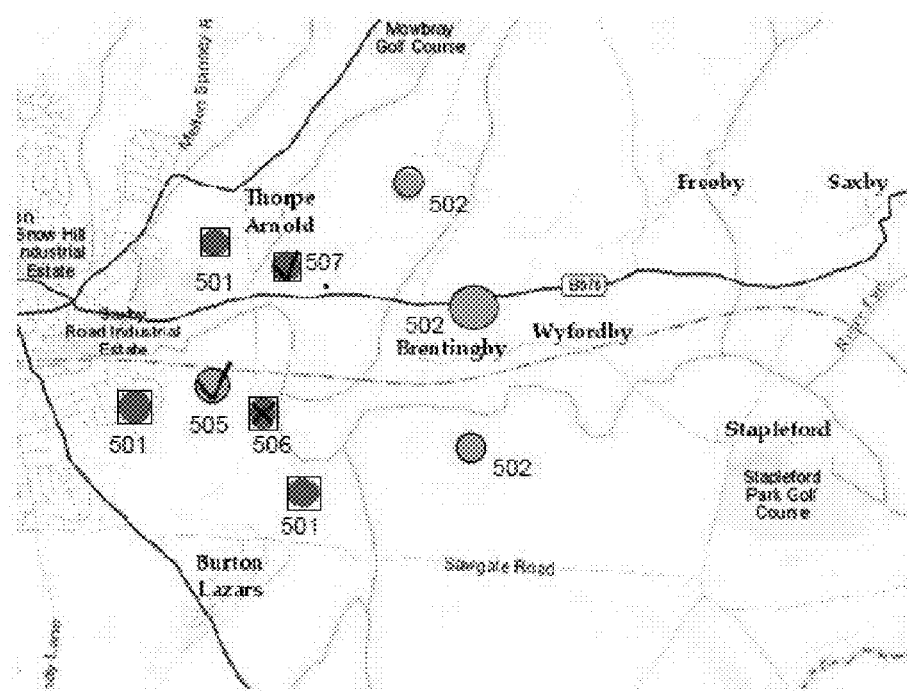
FIG. 5C is a schematic illustration of an example of a data region of a user interface display showing a geographical map with visual objects with modified rule results, according to some embodiments of the invention.

Reference is now made to FIG. 5C, which is a schematic illustration of an example of a data region of a user interface display showing a geographical map with visual objects with modified rule results, according to some embodiments of the invention. This figure is a continuation of the examples in FIG. 5A and FIG. 5B. The method modifies the rule based on the visual objects marked in FIG. 5B (503 and 504) and modifies the visual objects that have had a change in rule results because of this modification. For example, visual object 505 is now non-compliant with the rule as requested by the user making 503, and overlaid with a check mark. For example, visual object 507 is now compliant with the rule as requested by the user making 504, and overlaid with a check mark. For example, visual object 506 is now compliant with the rule, which is an unexpected result and marked with an overlaid "x" marked by the method.

Optionally, the user interface display includes a time selection slider widget, such that the user moves the slider to see the current rule result and data record values at a given time. Optionally, the user interface display includes a time window widget, such that the user sets time upper and lower boundaries to visualize the events that were detected in that time window.

Optionally, when a rule result is determined by several data records, the relation between the rule results and the data records can be visualized interactively. For example, when the user hovers over a rule result, all the causing data records change an attribute of the visual objects, such as a change in size, color, blinking pattern, and the like. For example, when a user selects a rule result, this rule result is connected by lines to the data records determining this result. Optionally, a rule result can have a different visual object attribute than related data records.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant algorithms for rule adjustment will be developed and the scope of the term algorithm is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for applying rules on data records and displaying information facilitating visually modifying the rules on a user interface, comprising:
using at least one processor for:
executing a plurality of computation instructions on each of a plurality of data records, said plurality of computation instructions are executed for applying a rule, each one of said plurality of data records comprising at least one physical location value;
outputting to a computerized display device a simulation for displaying to a user, comprising a plurality of visual objects, each of said plurality of visual objects corresponding to a respective result of said applying said rule to one of said plurality of data records and displayed on said computerized display device at a position representing said at least one physical location value corresponding to said one of said plurality of data records;
identifying at least one marking of at least one of said plurality of visual objects by a marking action of a user input device on said computerized display, said marking action indicates a user desired adjustment in said results of applying said rule;
in response to said identifying, modifying said plurality of computation instructions to produce a modified rule, based on said at least one marking;
executing said modified plurality of computation instructions for applying said modified rule to at least one of said plurality of data records;
generating a modified simulation from said simulation, by said executing said modified plurality of computation instructions; and
outputting to said computerized display device said modified simulation for displaying to said user.

2. The method of claim 1, wherein said method further comprises modifying at least one of said plurality of visual objects on said computerized display to show said at least one marking received from said user.

3. The method of claim 1, wherein said method further comprises modifying at least one of said plurality of visual objects on said computerized display to show a modified result of applying said modified rule to said at least one of said plurality of data records.

4. The method of claim 1, wherein said method further comprises modifying at least one of said plurality of visual objects on said computerized display to show an indication of said rule modification.

5. The method of claim 1, wherein said modifying comprises changing automatically at least one threshold value of at least one of said plurality of computation instructions.

6. The method of claim 1, wherein said modifying comprises changing at least one threshold value of at least one of said plurality of computation instructions by receiving a user instruction.

7. The method of claim 1, wherein said modifying comprises changing automatically at least one threshold value of at least one of said plurality of computation instructions according to a data mining algorithm, a machine learning algorithm, a clustering algorithm, and a supervised learning algorithm.

8. The method of claim 1, wherein at least one of said plurality of computation instructions further comprises at least one variable associated with a field of said plurality of data records and said modifying comprises replacing said at least one variable with at least one second variable associated with a second field of said plurality of data records.

9. The method of claim 1, wherein said modifying comprises any from a list of replacing at least one of said plurality of computation instructions, adding at least one new computation instruction, and removing at least one of said plurality of computation instructions.

10. The method of claim 1, wherein said rule is any from a list of a time dependent rule and a rule of a plurality of events.

11. The method of claim 1, wherein at least one of said plurality of visual objects represent a corresponding at least one temporal data value.

12. The method of claim 1, wherein said plurality of data records further comprise temporal data.

13. The method of claim 1, wherein said displaying further indicates at least one relationship between said plurality of data records.

14. The method of claim 1, wherein at least one of said plurality of computation instructions is modified by changing at least one physical location area for application of said at least one of said plurality of computation instructions.

15. The method of claim 1, wherein said at least one marking to at least one of said plurality of visual object is marking of a false result.

16. The method of claim 1, wherein said plurality of visual objects are displayed with at least one graphical attribute displayed according to a field value of corresponding one of said plurality of data records any from a list of a visual object size, a visual object shape, a visual object texture, a visual object color, a visual object hue, a visual object transparency, a visual object brightness, a visual object saturation, a visual object size, an overlaid at least one character, and an overlaid at least one second visual object.

17. The method of claim 16, wherein said at least one graphical attribute is displayed using additional blinking patterns.

18. A computer readable medium comprising computer executable instructions adapted to perform the method of claim 1.

19. A computer program product for applying rules on data records and displaying information facilitating visually modifying the rules on a user interface, said computer program product comprising:
a computer readable storage medium having stored thereon:
first program instructions executable by a processor to cause a device to execute a plurality of computation instructions on each of a plurality of data records, said plurality of computation instructions are executed for applying a rule, each one of said plurality of data records comprising at least one physical location value;
second program instructions executable by a processor to cause a device to display a simulation comprising a plurality of visual objects, each of said plurality of visual objects showing a result of said applying said rule to one of said plurality of data records, and displayed on a computerized display at a position representing said at least one physical location value corresponding to said one of said plurality of data records;
third program instructions executable by a processor to cause a device to identify at least one marking of at least one of said plurality of visual objects by a marking action of a user input device on said computerized display, said marking action indicates a user desired adjustment in said results of applying said rule;

fourth program instructions executable by a processor to cause a device to modify said plurality of computation instructions to produce a modified rule, based on said at least one marking, and in response to said identifying;

fifth program instructions executable by said processor to cause said device to execute said modified plurality of computation instructions for applying said modified rule to at least one of said plurality of data records;

sixth program instructions executable by said processor to cause said device to generate a modified simulation from said simulation, by said executing said modified plurality of computation instructions; and seventh program instructions executable by said processor to cause said device to display said modified simulation.

20. A computerized device for applying rules on data records and displaying information facilitating visually modifying the rules, comprising:

a user interface;

at least one processing unit, comprising modules of processor instructions configured to:

execute a plurality of computation instructions defining a rule on a plurality of data records, each one of said plurality of data records comprising at least one physical location value;

display using said user interface a simulation comprising a plurality of visual objects, each of said plurality of visual objects showing a result of applying said rule to one of said plurality of data records, and displayed on a computerized display at a position representing said at least one physical location value corresponding to said one of said plurality of data records;

identify at least one marking of at least one of said plurality of visual objects by a marking action of a user on said computerized display, said marking action indicates a user desired adjustment in said results of applying said rule;

in response to said identifying, modify said plurality of computation instructions to produce a modified rule, based on said at least one marking;

execute said modified plurality of computation instructions to apply said modified rule to at least one of said plurality of data records generate a modified simulation from said simulation, by said executing said modified plurality of computation instructions; and display, using said user interface, said modified simulation.

* * * * *